US006857325B2

(12) United States Patent
Sato

(10) Patent No.: US 6,857,325 B2
(45) Date of Patent: Feb. 22, 2005

(54) MOVING BLADE SUPPORT JIG, MOVING BLADE SUPPORT APPARATUS, AND FLOW RATE MEASURING APPARATUS

(75) Inventor: Yoichi Sato, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 42 days.

(21) Appl. No.: 10/434,471

(22) Filed: May 9, 2003

(65) Prior Publication Data

US 2004/0221659 A1 Nov. 11, 2004

(51) Int. Cl.[7] ............................ G01F 1/05; F04D 29/38
(52) U.S. Cl. ....................... 73/861.79; 73/861; 415/115
(58) Field of Search .............................. 73/861, 861.71, 73/861.74, 861.75, 861.79, 272; 415/115

(56) References Cited

U.S. PATENT DOCUMENTS 5,957,657 A * 9/1999 Akita et al. ................. 415/115
6,565,311 B2 * 5/2003 Oya et al. ................... 415/115

* cited by examiner

*Primary Examiner*—Harshad Patel
(74) *Attorney, Agent, or Firm*—Armstrong, Kratz, Quintos, Hanson & Brooks, LLP

(57) ABSTRACT

A sealing member is inserted into a frame, with an inclined support surface being fitted to an inclined holding surface. A gas turbine moving blade is pressed toward the frame to fit the inclined support surface to the inclined holding surface, while generating a surface contact pressure therebetween, thereby tightly holding the gas turbine moving blade against the frame. Thus, the gas turbine moving blade is mounted on a flow rate measuring apparatus, with flow of air into a cooling medium inflow port being uninterrupted and without escape of air to the outside.

9 Claims, 7 Drawing Sheets

MOVING BLADE SUPPORT JIG, MOVING BLADE SUPPORT APPARATUS, AND FLOW RATE MEASURING APPARATUS

BACKGROUND OF THE INVENTION

1. Field of the Invention

This invention relates to a flow rate measuring apparatus for measuring the flow rate of a cooling medium flowing through a gas turbine moving blade, within which a hollow passage is formed for introduction of the cooling medium, a moving blade support apparatus in the flow rate measuring apparatus, and a moving blade support jig in the moving blade support apparatus.

2. Description of the Related Art

A gas turbine has gas turbine moving blades in a circumferential direction of a rotor. In the gas turbine, a rotating shaft is rotationally driven by a combustion gas flowing between the adjacent gas turbine moving blades to drive a compressor and a generator, for example.

A high temperature combustion gas is introduced into the gas turbine, and the gas turbine moving blades and gas turbine stationary blades at a preceding stage are exposed to high temperatures. Thus, cooled blades, within which hollow passages are formed for entry of a cooling medium, may be used as gas turbine moving blades at an inlet of the gas turbine.

The passages of the gas turbine moving blade are supplied with the cooling medium (compressed air) through a cooling medium inflow port formed at a bottom surface of the site of embedding of the blade in the rotor (see, for example, Japanese Unexamined Patent Publication No. 2000-12205).

In the gas turbine moving blade, measurement for finding whether a predetermined amount of the cooling medium flows through the passages of the gas turbine moving blade is made at completion of a new blade or during periodical inspection for quality control.

In this case, the gas turbine moving blade is mounted on a flow rate measuring device, and air or the like is flowed through the cooling medium inflow port so that its flow rate is measured, whereby it is evaluated whether a predetermined amount of the cooling medium flows through the passages of the gas turbine moving blade.

Mounting of the gas turbine moving blade on the flow rate measuring device is performed, such that the gas turbine moving blade is attached to an air inflow portion, with a sealing plate member made of rubber or the like, as a moving blade support jig, being interposed at the cooling medium inflow port (the bottom surface of a portion of the moving blade embedded in the rotor), in order to prevent air supplied from leaking to the outside. In the sealing plate member made of rubber or the like, a hole of the same shape and at the same location as the cooling medium inflow port is formed so that air does not escape outside and the flow of air is not impeded.

That is, as shown in FIG. 7, a gas turbine moving blade 81 has a Christmas tree-shaped embedded portion 82 formed so as to be held by a rotor, and a blade portion 85 is formed, with a shank 83 and a platform 84 being disposed between the embedded portion 82 and the blade portion 85. In the gas turbine moving blade 81, a hollow passage into which a cooling medium is to be introduced is formed, and a cooling medium inflow port 86 communicating with the passage is formed at a bottom surface of the embedded portion 82.

In a flow rate measuring device 90, a box body 87 is provided for supplying air to the gas turbine moving blade

81, and the gas turbine moving blade 81 is fixed by a hold-down jig 91, with the cooling medium inflow port 86 of the embedded portion 82 in alignment with a supply port 88 of the box body 87. A sealing plate member (a rubber hold-down plate) 89 made of rubber or the like is provided between the supply port 88 and the cooling medium inflow port 86 of the embedded portion 82. A hole of the same shape and at the same location as the cooling medium inflow port 86 is formed in the rubber hold-down plate 89.

The gas turbine moving blade 81 is mounted on the flow rate measuring device 90, and air or the like is supplied to the cooling medium inflow port 86 through the supply port 88 of the box body 87. The air or the like is flowed through a passage inside the gas turbine moving blade 81 so that the flow rate of the air or the like is measured. By this means, it is evaluated whether a predetermined amount of the cooling medium is flowing through the passage of the gas turbine moving blade 81. The air supplied to the cooling medium inflow port 86 through the supply port 88 is kept by the rubber hold-down plate 89 from leaking out.

With the conventional measurement of the flow rate in the gas turbine moving blade 81, the sealing plate member (rubber hold-down plate 89) made of rubber or the like is used to prevent leakage of air to the outside, without interruption of the flow of air. If misalignment occurs during mounting, however, the hole of the rubber hold-down plate 89 may interfere with the cooling medium inflow port 86, partially blocking the cooling medium inflow port 86.

If the cooling medium inflow port 86 is partially blocked, the amount of air flowing into the passage through the cooling medium inflow port 86 may vary, causing an error in the measured value of the flow rate, thereby making the accurate determination of the flow rate impossible.

SUMMARY OF THE INVENTION

The present invention has been accomplished in the light of the foregoing circumstances. An object of the present invention is to provide a moving blade support jig capable of mounting a gas turbine moving blade on a flow rate measuring apparatus, with the flow of air being uninterrupted and without escape of air to the outside.

Another object of the invention is to provide a moving blade support apparatus using a moving blade support jig capable of mounting a gas turbine moving blade on a flow rate measuring apparatus, with the flow of air being uninterrupted and without escape of air to the outside.

Still another object of the invention is to provide a flow rate measuring apparatus equipped with a moving blade support apparatus using a moving blade support jig by which a gas turbine moving blade is mounted, with the flow of air being uninterrupted and without escape of air to the outside.

In a first aspect, the present invention provides a moving blade support jig for supporting a gas turbine moving blade on a support apparatus for measurement of a flow rate, the gas turbine moving blade having a hollow passage formed in an interior thereof for introduction of a cooling medium, and the gas turbine moving blade also having a cooling medium inflow port formed at a bottom surface of an embedded portion thereof to be embedded in a rotor, the cooling medium inflow port communicating with the passage, the moving blade support jig comprising: a frame fixed to a moving blade support apparatus and having an inclined holding surface formed at an inner peripheral surface thereof; and a sealing member fitted to and held by an outer periphery of the embedded portion of the gas turbine moving blade, and having formed at an outer peripheral surface thereof an inclined support surface in engagement with the inclined holding surface of the frame, and wherein the sealing member is inserted into the frame, with the inclined support surface being fitted to the inclined holding surface, and the gas turbine moving blade is pressed toward the frame, whereby the inclined support surface is fitted to the inclined holding surface, with a surface contact pressure being generated therebetween, so that the gas turbine moving blade is tightly held by the frame.

Thus, there can be provided a moving blade support jig capable of mounting a gas turbine moving blade on a flow rate measuring apparatus, with the flow of a cooling medium into a cooling medium inflow port being uninterrupted and without escape of the cooling medium to the outside.

In a second aspect, the invention provides a moving blade support jig for supporting a gas turbine moving blade on a support apparatus for measurement of a flow rate, the gas turbine moving blade having a hollow passage formed in an interior thereof for introduction of a cooling medium, and the gas turbine moving blade also having a cooling medium inflow port formed at a bottom surface of an embedded portion thereof to be embedded in a rotor, the cooling medium inflow port communicating with the passage, the moving blade support jig comprising: a frame fixed to a moving blade support apparatus and having a holding surface formed at an inner peripheral surface thereof; and a sealing member fitted to and held by an outer periphery of the embedded portion of the gas turbine moving blade via an inclined surface, and having formed at an outer peripheral surface thereof a support surface in engagement with the holding surface of the frame, and wherein the sealing member is inserted into the frame, with the support surface being fitted to the holding surface, and the gas turbine moving blade is pressed toward the frame, whereby the gas turbine moving blade is tightly held by the frame, with a surface contact pressure being generated between the embedded portion and the inclined surface.

Thus, there can be provided a moving blade support jig capable of mounting a gas turbine moving blade on a flow rate measuring apparatus, with the flow of a cooling medium into a cooling medium inflow port being uninterrupted and without escape of the cooling medium to the outside.

In a third aspect, the invention provides a moving blade support jig for supporting a gas turbine moving blade on a support apparatus for measurement of a flow rate, the gas turbine moving blade having a hollow passage formed in an interior thereof for introduction of a cooling medium, and the gas turbine moving blade also having a cooling medium inflow port formed at a bottom surface of an embedded portion thereof to be embedded in a rotor, the cooling medium inflow port communicating with the passage, the moving blade support jig comprising: a frame fixed to a moving blade support apparatus and having an inclined holding surface formed at an inner peripheral surface thereof; and a sealing member fitted to and held by an outer periphery of the embedded portion of the gas turbine moving blade via an inclined surface, and having formed at an outer peripheral surface thereof an inclined support surface in engagement with the inclined holding surface of the frame, and wherein the sealing member is inserted into the frame, with the inclined support surface being fitted to the inclined holding surface, and the gas turbine moving blade is pressed toward the frame, whereby the inclined support surface is fitted to the inclined holding surface, with a surface contact pressure being generated between the embedded portion and the inclined surface and between the inclined support surface and the inclined holding surface, so that the gas turbine moving blade is tightly held by the frame.

Thus, there can be provided a moving blade support jig capable of mounting a gas turbine moving blade on a flow rate measuring apparatus, with the flow of a cooling medium into a cooling medium inflow port being uninterrupted and without escape of the cooling medium to the outside.

In the moving blade support jig, the frame may be composed of a metal, and the sealing member may be composed of an elastic material.

In the moving blade support jig, the sealing member may be configured such that a front end of the embedded portion protrudes from a bottom surface of the sealing member.

In a fourth aspect, the invention provides a moving blade support apparatus comprising: a chamber connected to a fluid support source by a channel having flow rate measuring means; and the aforementioned moving blade support jig provided in the chamber.

Thus, there can be provided a moving blade support apparatus using a moving blade support jig which can mount a gas turbine moving blade on a flow rate measuring apparatus, with the flow of a cooling medium into a cooling medium inflow port being uninterrupted and without escape of the cooling medium to the outside.

In a fifth aspect, the invention provides a flow rate measuring apparatus comprising: a frame having an inclined holding surface formed at an inner peripheral surface thereof; a sealing member fitted to and held by an outer periphery of an embedded portion of a gas turbine moving blade to be embedded in a rotor, and having formed at an outer peripheral surface thereof an inclined support surface in engagement with the inclined holding surface of the frame; a chamber fitted with the frame; a fluid supply source connected to the chamber via a channel; flow rate measuring means provided on the channel; and hold-down means for pressing the gas turbine moving blade toward the frame so that a surface contact pressure is generated between the inclined support surface and the inclined holding surface when the sealing member is inserted into the frame, with the sealing member being fitted to the embedded portion of the gas turbine moving blade, and wherein: the gas turbine moving blade has a hollow passage formed in an interior thereof for introduction of a cooling medium, and also has a cooling medium inflow port formed at a bottom surface of the embedded portion, the cooling medium inflow port communicating with the passage; the sealing member is inserted into the frame, and the gas turbine moving blade is pressed toward the frame by the hold-down means, whereby a surface contact pressure is generated between the inclined support surface and the inclined holding surface, so that the cooling medium inflow port faces an interior of the chamber while being cut off from an outside; and flow of a fluid through the hollow passage in the gas turbine moving blade is determined by a situation of measurement by the flow rate measuring means when the fluid is supplied from the fluid supply source into the chamber and flowed into the hollow passage through the cooling medium inflow port.

Thus, there can be provided a flow rate measuring apparatus equipped with a moving blade support apparatus using a moving blade support jig by which a gas turbine moving blade is mounted, with the flow of a cooling medium into a cooling medium inflow port being uninterrupted and without escape of the cooling medium to the outside of the chamber.

In the flow rate measuring apparatus, the frame may be composed of a metal, and the sealing member may be composed of an elastic material.

In the flow rate measuring apparatus, the sealing member may be configured such that a front end of the embedded portion protrudes from a bottom surface of the sealing member.

Another embodiment of the flow rate measuring apparatus is one comprising: a frame having a holding surface formed at an inner peripheral surface thereof; a sealing member fitted to and held by an outer periphery of an embedded portion, to be embedded in a rotor, of a gas turbine moving blade via an inclined surface, and having formed at an outer peripheral surface thereof a support surface fixed to the holding surface of the frame; a chamber fitted with the frame; a fluid supply source connected to the chamber via a channel; flow rate measuring means provided on the channel; and hold-down means for pressing the gas turbine moving blade toward the frame so that a surface contact pressure is generated between the embedded portion and the inclined surface when the sealing member is inserted into the frame, with the sealing member being fitted to the embedded portion of the gas turbine moving blade, and wherein: the gas turbine moving blade has a hollow passage formed in an interior thereof for introduction of a cooling medium, and also has a cooling medium inflow port formed at a bottom surface of the embedded portion, the cooling medium inflow port communicating with the passage; the sealing member is inserted into and fixed to the frame, and the gas turbine moving blade is pressed toward the frame by the hold-down means, whereby a surface contact pressure is generated between the embedded portion and the inclined surface, so that the cooling medium inflow port faces an interior of the chamber while being cut off from an outside; and flow of a fluid through the hollow passage in the gas turbine moving blade is determined by a situation of measurement by the flow rate measuring means when the fluid is supplied from the fluid supply source into the chamber and flowed into the hollow passage through the cooling medium inflow port.

Still another embodiment of the flow rate measuring apparatus is one comprising: a frame having an inclined holding surface formed at an inner peripheral surface thereof; a sealing member fitted to and held by an outer periphery of an embedded portion, to be embedded in a rotor, of a gas turbine moving blade via an inclined surface, and having formed at an outer peripheral surface thereof an inclined support surface in engagement with the inclined holding surface of the frame; a chamber fitted with the frame; a fluid supply source connected to the chamber via a channel; flow rate measuring means provided on the channel; and hold-down means for pressing the gas turbine moving blade toward the frame so that a surface contact pressure is generated between the embedded portion and the inclined surface and between the inclined support surface and the inclined holding surface when the sealing member is inserted into the frame, with the sealing member being fitted to the embedded portion of the gas turbine moving blade, and wherein: the gas turbine moving blade has a hollow passage formed in an interior thereof for introduction of a cooling medium, and also has a cooling medium inflow port formed at a bottom surface of the embedded portion, the cooling medium inflow port communicating with the passage; the sealing member is inserted into the frame, and the gas turbine moving blade is pressed toward the frame by the hold-down means, whereby a surface contact pressure is generated between the embedded portion and the inclined surface and between the inclined support surface and the inclined holding surface, so that the cooling medium inflow port faces an interior of the chamber while being cut off from an outside; and flow of a fluid through the hollow passage in the gas turbine moving blade is determined by a situation of measurement by the flow rate measuring means when the fluid is supplied from the fluid supply source into the chamber and flowed into the hollow passage through the cooling medium inflow port.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Preferred embodiments of the present invention will now be described in detail with reference to the accompanying drawings, which in no way limit the invention.

Figure 1:
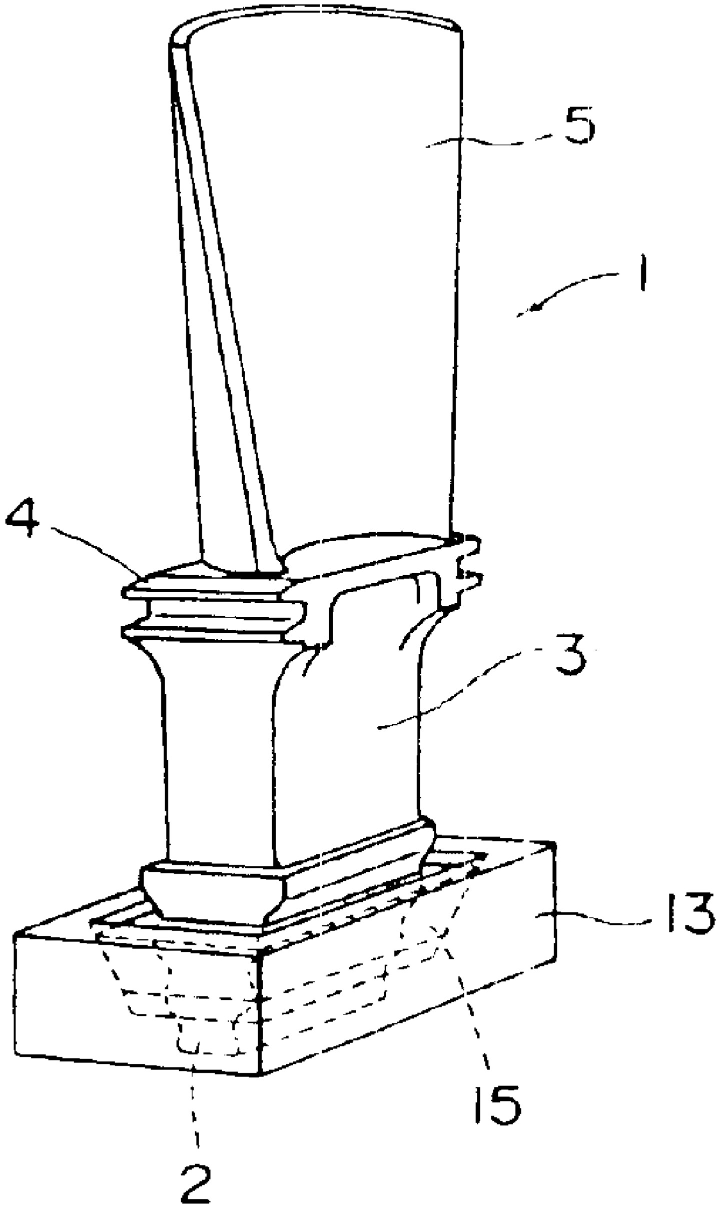
FIG. 1 is a perspective view of a gas turbine moving blade mounted on a moving blade support jig according to an embodiment of the present invention.
Figure 2:
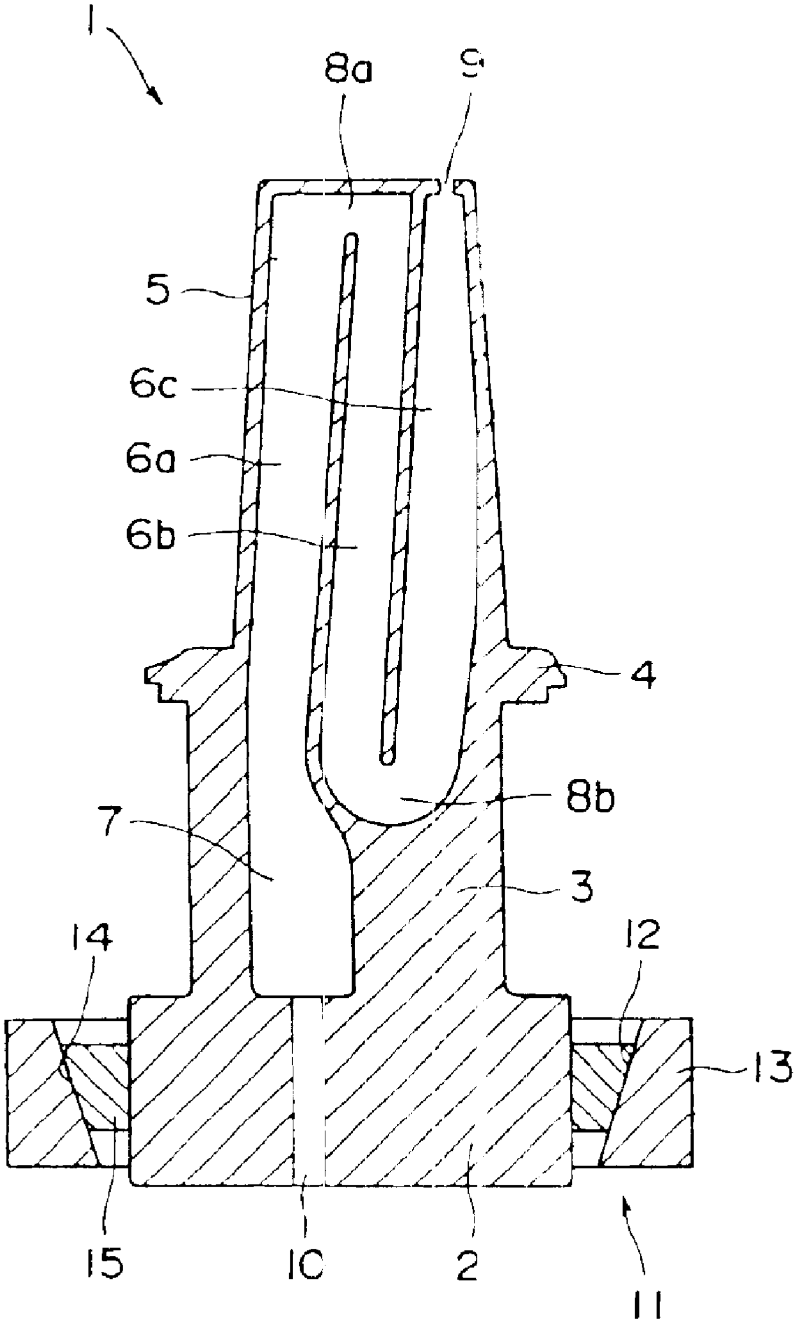
FIG. 2 is a sectional view of FIG. 1.

As shown in FIGS. 1 and 2, a gas turbine moving blade 1 has a Christmas tree-shaped embedded portion 2 formed so as to be held by a rotor (not shown). A blade portion (blade profile portion) 5 is formed, with a shank 3 and a platform 4 being interposed between the embedded portion 2 and the blade portion 5.

In the gas turbine moving blade 1, a hollow extending vertically is formed to define, for example, three passages **6*a*, 6*b* and 6*c* in an area between a front edge and a rear edge of the gas turbine moving blade 1. A cooling channel 7, through which a cooling medium (for example, compressed air) is fed from the rotor, communicates with the passage 6*a*** located beside the front edge.

The passage **6*a* beside the front edge and the passage 6*b* located at the center communicate at an upper fold-back portion 8*a*. The cooling fluid flowing upward through the passage 6*a* changes course at the fold-back portion 8*a*, flowing downward through the passage 6*b***.

The passage **6*b* and the passage 6*c* located beside the rear edge communicate at a lower fold-back portion 8*b*. The cooling fluid flowing downward through the passage 6*b* changes course at the fold-back portion 8*b*, flowing upward through the passage 6*c*. The cooling fluid flowing upward through the passage 6*c* is discharged through a discharge port 9 provided at the upper end of the gas turbine moving blade 1**.

A cooling medium inflow port 10, communicating with the cooling channel 7, is formed at a bottom surface of the embedded portion 2. When the embedded portion 2 is held in the rotor, compressed air is supplied into the cooling channel 7 through the cooling medium inflow port 10.

The arrangement of the passages 6 of the gas turbine moving blade 1 in the illustrated embodiment is an example, and the number of the passages 6 and the situation of supply of compressed air may be changed as desired. For example, four of the passages 6 and two of the cooling channels 7 may be provided. In this case, the cooling medium inflow ports 10 are formed at two locations in conformity with the number of the cooling channels 7.

In the gas turbine moving blade 1 with the above features, measurement for finding whether a predetermined amount of the cooling medium is flowing through the passages of the gas turbine moving blade is made at completion of a new blade or during periodical inspection for quality control.

In this case, the gas turbine moving blade 1 is mounted on a flow rate measuring device, and air or the like is flowed through the cooling medium inflow port 10 so that its flow rate is measured, whereby it is evaluated whether a predetermined amount of the cooling medium is flowing through the passages 6 of the gas turbine moving blade 1.

When the gas turbine moving blade 1 is to be mounted on the flow rate measuring device, the gas turbine moving blade 1 is first attached to a moving blade support jig 11 to be described below.

The moving blade support jig 11 is composed of a metallic frame 13, which is fixed to a moving blade support apparatus (to be described later) and which has an inclined holding surface 12 formed on an inner peripheral surface thereof; and a so-called wedge-shaped sealing member 15 of an elastic material (for example, rubber), which is fitted to and held by the outer periphery of the embedded portion 2 of the gas turbine moving blade 1 and which has formed, on an outer peripheral surface thereof, an inclined support surface 14 in engagement with the inclined holding surface 12 of the frame 13.

By using the moving blade support jig 11, the sealing member 15 is inserted into the frame 13, with the inclined support surface 14 in fitting engagement with the inclined holding surface 12. When the gas turbine moving blade 1 is pressed toward the frame 13, the inclined support surface 14 is fitted to the inclined holding surface 12, with a surface contact pressure occurring, with the result that the gas turbine moving blade 1 is tightly held by the frame 13.

Figure 3:
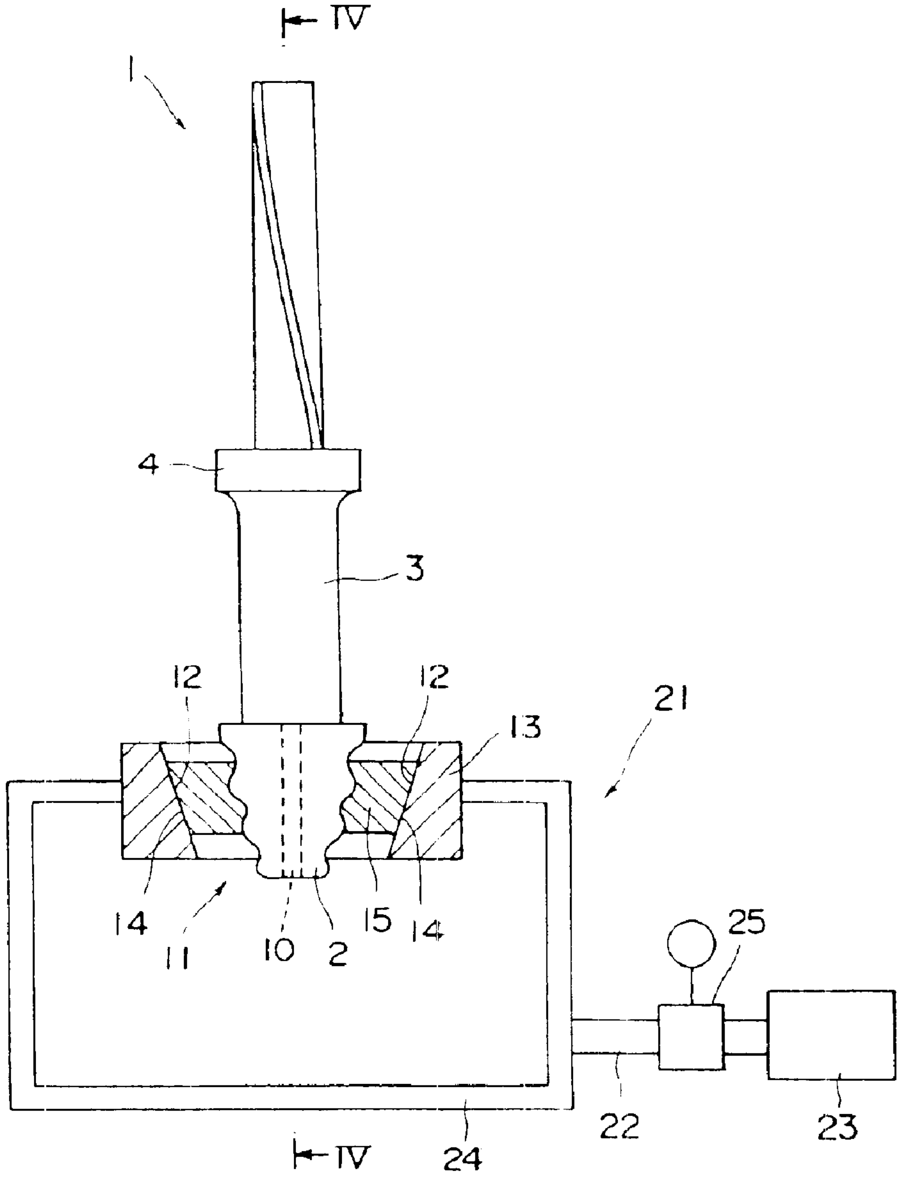
FIG. 3 is a sectional view of a flow rate measuring apparatus mounted with the gas turbine moving blade.

When the sealing member 15 is fitted to and held by the outer periphery of the embedded portion 2 of the gas turbine moving blade 1, the front end of the embedded portion 2 protrudes from the bottom surface of the sealing member 15, as shown in FIGS. 2 and 3. As a result, the surface contact pressure working between the sealing member 15 and the embedded portion 2 becomes uniform, and thus can reliably prevent air leakage from between the sealing member 15 and the embedded portion 2.

The frame 13 of the moving blade support jig 11 is fixed to a chamber, as a moving blade support apparatus, of a flow rate measuring apparatus.

The flow rate measuring apparatus will be described with reference to FIGS. 3 and 4.

A flow rate measuring apparatus 21 has a chamber 24 which is connected to a fluid supply source 23, such as a compressor or a blower, by a channel 22. Air is supplied from the fluid supply source 23 to the interior of the chamber 24 via the channel 22. A flow rate measuring means 25 is provided on the channel 22 to measure the flow rate of air supplied from the fluid supply source 23 into the chamber 24.

The frame 13 of the moving blade support jig 11 is fixed to an upper portion of the chamber 24. By mounting the gas turbine moving blade 1 on the moving blade support jig 11, the gas turbine moving blade 1 is set in place, with the cooling medium inflow port 10 of the embedded portion 2 facing the interior of the chamber 24.

Hold-down means 26 are provided for pressing the gas turbine moving blade 1 toward the frame 13 so that a surface contact pressure occurs between the inclined support surface 14 and the inclined holding surface 12 when the sealing member 15 is inserted into the frame 13, with the sealing member 15 being fitted to the embedded portion 2 of the gas turbine moving blade 1.

Figure 4:
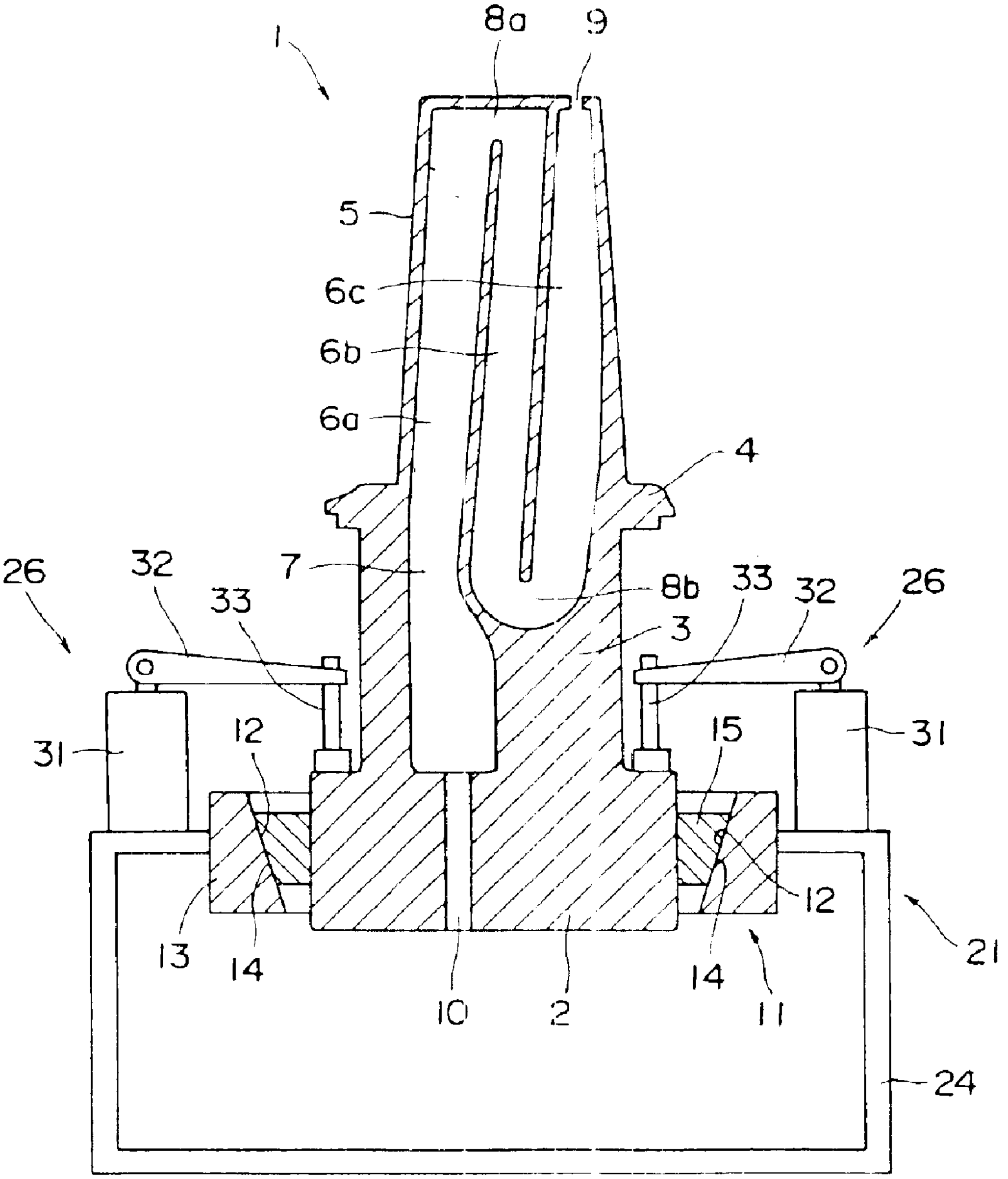
FIG. 4 is a sectional view taken along line IV-IV in FIG. 3.

As shown in FIG. 4, the hold-down means 26 has an actuator 31 fixed to the chamber 24. The actuator 31 is driven to cause a hold-down rod 33 via an arm 32 to press the embedded portion 2 of the gas turbine moving blade 1 downward. That is, the inclined support surface 14 of the sealing member 15 is pressed against the inclined holding surface 12 of the frame 13, generating a surface contact pressure between the inclined support surface 14 and the inclined holding surface 12.

Consequently, the inclined support surface 14 and the inclined holding surface 12 are brought into intimate contact, so that the cooling medium inflow port 10 of the gas turbine moving blade 1 faces the interior of the chamber 24 while being cut off from the outside.

Air is supplied from the fluid supply source 23 into the chamber 24, with the gas turbine moving blade 1 being mounted on the flow rate measuring apparatus 21 with the use of the moving blade support jig 11 (the state illustrated in FIGS. 3 and 4). At this time, air is supplied into the cooling channel 7 (see FIGS. 1 and 2) through the cooling medium inflow port 10 facing the interior of the chamber 24.

In this state, the flow rate of air supplied into the chamber 24 is measured with the flow rate measuring means 25, whereby the flow rate of air flowing through the passages 6 (see FIGS. 1 and 2) from the cooling channel 7 (see FIGS. 1 and 2) is measured.

By mounting the gas turbine moving blade 1 on the flow rate measuring apparatus 21 with the use of the aforementioned moving blade support jig 11, the surface contact pressure between the inclined support surface 14 of the sealing member 15 and the inclined holding surface 12 of the frame 13 can be generated under a vertical force of the hold-down means 26. In this manner, a seal can be formed when the gas turbine moving blade 1 is mounted using the embedded portion 2.

The gas turbine moving blade 1 is mounted on the flow rate measuring apparatus 21, with the cooling medium inflow port 10 facing the interior of the chamber 24 being completely exposed. Thus, air for measurement is reliably supplied into the cooling channel 7 through the cooling medium inflow port 10. This permits accurate measurement of the flow rate.

Accordingly, there can be provided the moving blade support jig 11 capable of mounting the gas turbine moving blade 1 on the flow rate measuring apparatus 21, with the flow of air into the cooling medium inflow port 10 being uninterrupted, and without escape of air to the outside of the chamber 24.

Also, there can be provided the moving blade support apparatus using the moving blade support jig 11 which can mount the gas turbine moving blade 1 on the flow rate measuring apparatus 21, with the flow of air into the cooling medium inflow port 10 being uninterrupted, and without escape of air to the outside of the chamber 24.

Furthermore, there can be provided the flow rate measuring apparatus 21 equipped with the moving blade support apparatus using the moving blade support jig 11 by which the gas turbine moving blade 1 can be mounted, with the flow of air into the cooling medium inflow port 10 being uninterrupted, and without escape of air to the outside of the chamber 24.

Figure 5:
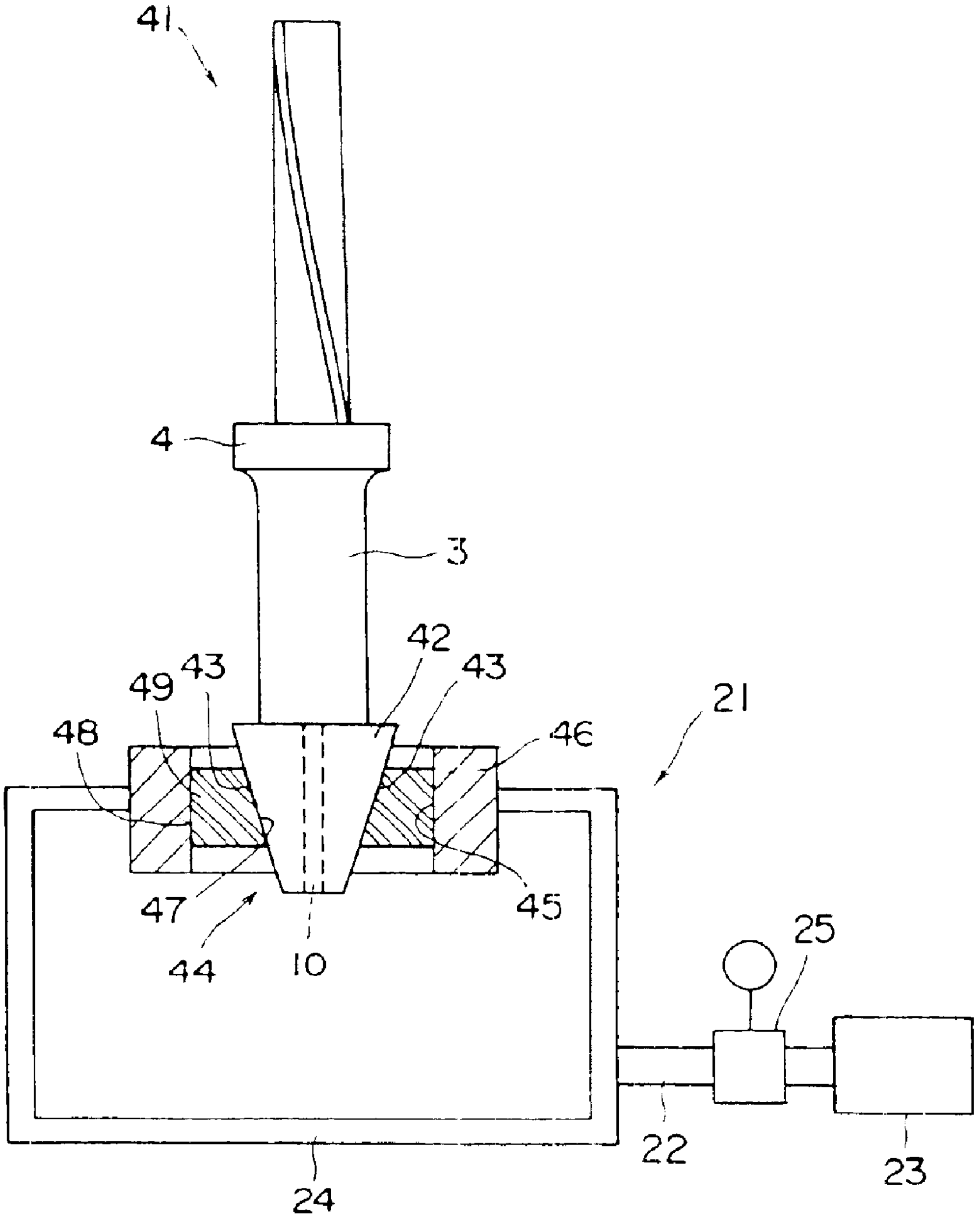
FIG. 5 is a sectional view of a flow rate measuring apparatus according to another embodiment of the present invention.

Another embodiment of the invention will be described with reference to FIG. 5. The same members as the members shown in FIGS. 1 to 4 are assigned the same numerals, and duplicate explanations are omitted.

As shown in the drawing, an embedded portion 42 of a gas turbine moving blade 41 has a trapezoidal cross sectional shape, and its outer peripheral surface 43 forms an inclined surface (a state before creation of a Christmas tree shape).

A moving blade support jig 44 is composed of a metallic frame 46, which is fixed to a moving blade support apparatus and which has a holding surface 45 formed on an inner peripheral surface thereof; and a sealing member 49 of an elastic material (for example, rubber), which is fitted to and held by the outer peripheral surface 43 of the embedded portion 42 of the gas turbine moving blade 41 via an inclined surface 47,and which has formed, on an outer peripheral surface thereof, a support surface 48 fixed to the holding surface 45 of the frame 46.

By using the moving blade support jig 44, the sealing member 49 is inserted into the frame 46, with the support surface 48 being fixed to the holding surface 45. When the gas turbine moving blade 41 is pressed toward the frame 46, the gas turbine moving blade 41 is tightly held by the frame 46, with a surface contact pressure occurring between the outer peripheral surface 43 of the embedded portion 42 and the inclined surface 47 of the sealing member 49.

Figure 6:
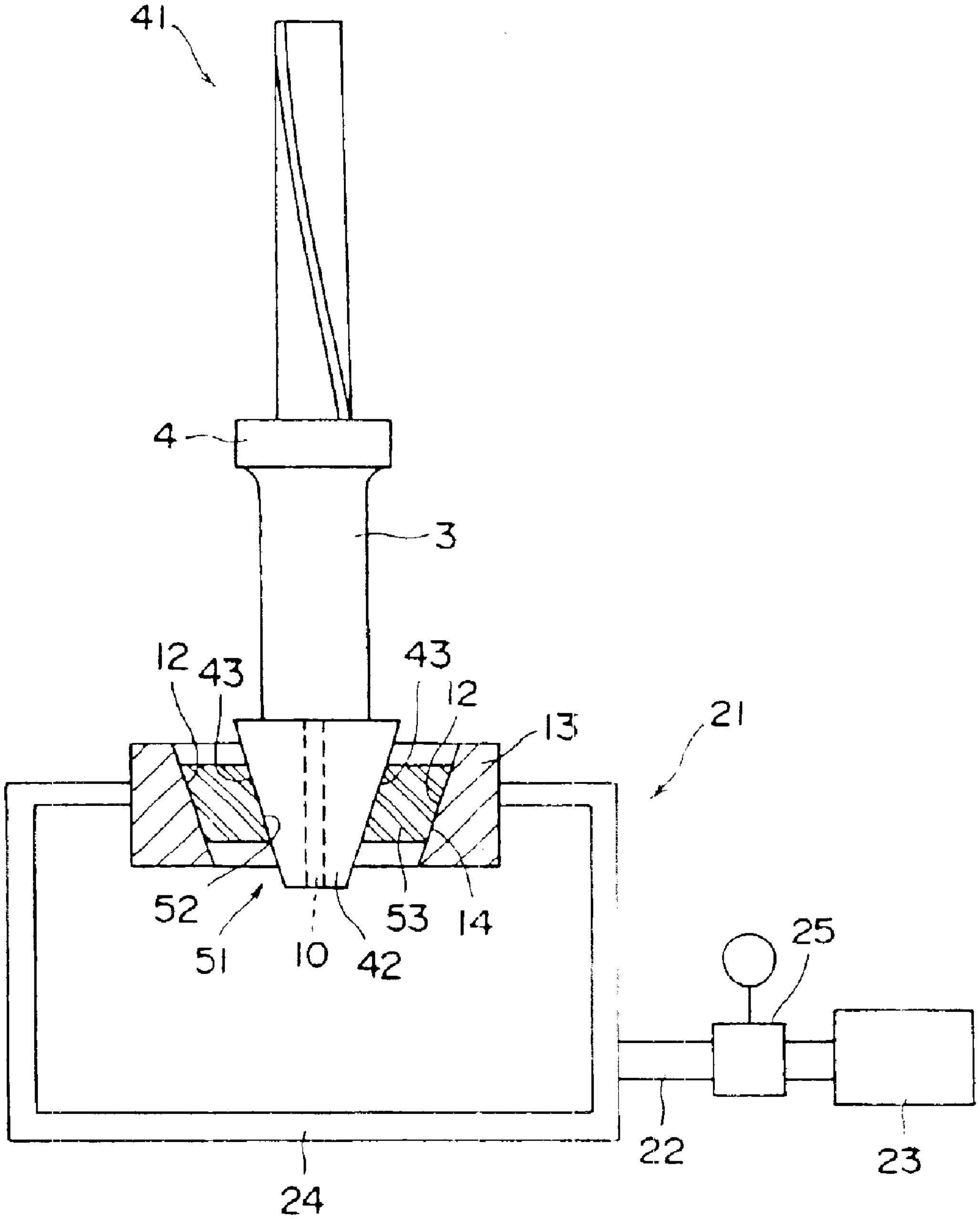
FIG. 6 is a sectional view of a flow rate measuring apparatus according to still another embodiment of the present invention.
Figure 7:
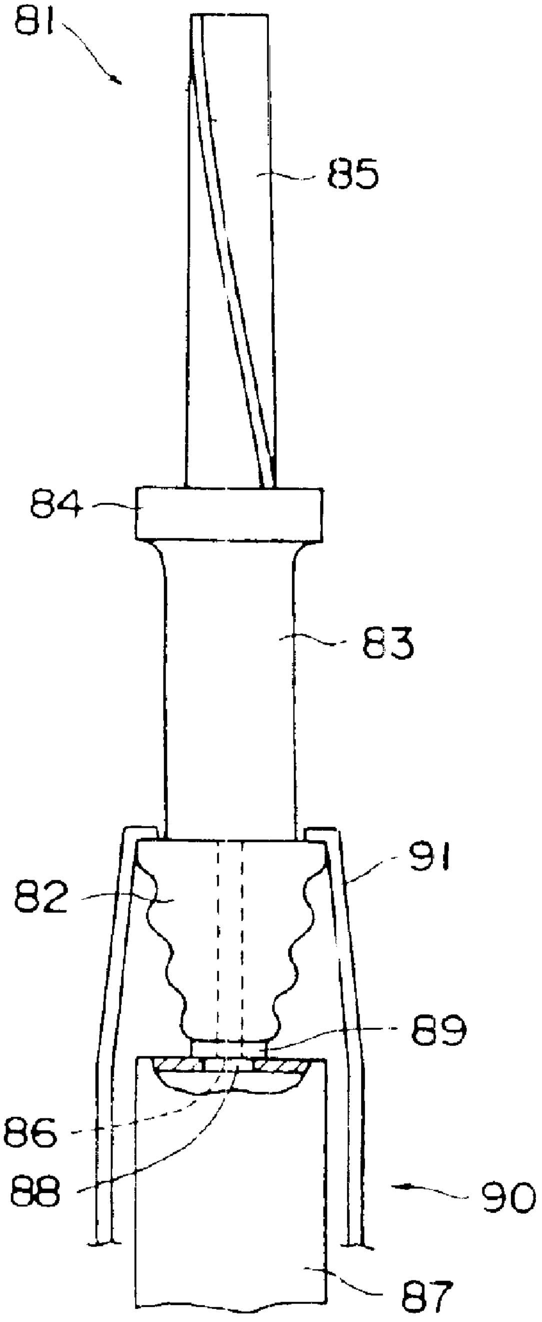
FIG. 7 is a sectional view of prior art.

Still another embodiment of the invention will be described with reference to FIG. 6. The same members as the members shown in FIGS. 1 to 5 are assigned the same numerals, and duplicate explanations are omitted.

As shown in the drawing, an embedded portion 42 of a gas turbine moving blade 41 has a trapezoidal cross sectional shape, and its outer peripheral surface 43 forms an inclined surface (a state before creation of a Christmas tree shape).

A moving blade support jig 51 is composed of a metallic frame 13, which is fixed to a moving blade support apparatus and which has an inclined holding surface 12 formed on an inner peripheral surface thereof; and a so-called wedge-shaped sealing member 53 of an elastic material (for example, rubber), which is fitted to and held by the outer peripheral surface 43 of the embedded portion 42 of the gas turbine moving blade 41 via an inclined surface 52 and which has formed, on an outer peripheral surface thereof, an inclined support surface 14 in engagement with the inclined holding surface 12 of the frame 13.

By using the moving blade support jig 51, the sealing member 53 is inserted into the frame 13, with the inclined support surface 14 in fitting engagement with the inclined holding surface 12. When the gas turbine moving blade 41 is pressed toward the frame 13, the inclined support surface 14 is fitted to the inclined holding surface 12, with a surface contact pressure occurring between the inclined support surface 14 and the inclined holding surface 12 and between the outer peripheral surface 43 of the embedded portion 42 and the inclined surface 52 of the sealing member 53, whereby the gas turbine moving blade 41 is tightly held by the frame 13.

While the present invention has been described by the foregoing embodiments, it is to be understood that the invention is not limited thereby, but may be varied and modified in many other ways. Such variations and modifications are not to be regarded as a departure from the spirit and scope of the invention, and all such variations and modifications as would be obvious to one skilled in the art are intended to be included within the scope of the appended claims.

What is claimed is:

1. A moving blade support jig for supporting a gas turbine moving blade on a support apparatus for measurement of a flow rate, said gas turbine moving blade having a hollow passage formed in an interior thereof for introduction of a cooling medium, and said gas turbine moving blade also having a cooling medium inflow port formed at a bottom surface of an embedded portion thereof to be embedded in a rotor, said cooling medium inflow port communicating with said passage, said moving blade support jig comprising:

a frame fixed to a moving blade support apparatus and having an inclined holding surface formed at an inner peripheral surface thereof; and peripheral surface thereof; and a sealing member fitted to and held by an outer periphery of said embedded portion of said gas turbine moving blade, and having formed at an outer peripheral surface thereof an inclined support surface in engagement with said inclined holding surface of said frame, and wherein said sealing member is inserted into said frame, with said inclined support surface being fitted to said inclined holding surface, and said gas turbine moving blade is pressed toward said frame, whereby said inclined support surface is fitted to said inclined holding surface, with a surface contact pressure being generated therebetween, so that said gas turbine moving blade is tightly held by said frame.

2. A moving blade support jig for supporting a gas turbine moving blade on a support apparatus for measurement of a flow rate, said gas turbine moving blade having a hollow passage formed in an interior thereof for introduction of a cooling medium, and said gas turbine moving blade also having a cooling medium inflow port formed at a bottom surface of an embedded portion thereof to be embedded in a rotor, said cooling medium inflow port communicating with said passage, said moving blade support jig comprising:

a frame fixed to a moving blade support apparatus and having a holding surface formed at an inner peripheral surface thereof; and a sealing member fitted to and held by an outer periphery of said embedded portion of said gas turbine moving blade via an inclined surface, and having formed at an outer peripheral surface thereof a support surface in engagement with said holding surface of said frame, and wherein said sealing member is inserted into said frame, with said support surface being fitted to said holding surface, and said gas turbine moving blade is pressed toward said frame, whereby said gas turbine moving blade is tightly held by said frame, with a surface contact pressure being generated between said embedded portion and said inclined surface.

3. A moving blade support jig for supporting a gas turbine moving blade on a support apparatus for measurement of a flow rate, said gas turbine moving blade having a hollow passage formed in an interior thereof for introduction of a cooling medium, and said gas turbine moving blade also having a cooling medium inflow port formed at a bottom surface of an embedded portion thereof to be embedded in a rotor, said cooling medium inflow port communicating with said passage, said moving blade support jig comprising:

a frame fixed to a moving blade support apparatus and having an inclined holding surface formed at an inner peripheral surface thereof; and a sealing member fitted to and held by an outer periphery of said embedded portion of said gas turbine moving blade via an inclined surface, and having formed at an outer peripheral surface thereof an inclined support surface in engagement with said inclined holding surface of said frame, and wherein said sealing member is inserted into said frame, with said inclined support surface being fitted to said inclined holding surface, and said gas turbine moving blade is pressed toward said frame, whereby said inclined support surface is fitted to said inclined holding surface, with a surface contact pressure being generated between said embedded portion and said inclined surface and between said inclined support surface and said inclined holding surface, so that said gas turbine moving blade is tightly held by said frame.

4. A moving blade support jig according to any one of claims 1 to 3, wherein said frame is composed of a metal, and said sealing member is composed of an elastic material.

5. A moving blade support jig according to anyone of claims 1 to 3, wherein said sealing member is configured such that a front end of said embedded portion protrudes from a bottom surface of said scaling member.

6. A moving blade support apparatus comprising:

a chamber connected to a fluid support source by a channel having flow rate measuring means; and a moving blade support jig according to any one of claims 1 to 3 provided in said chamber.

7. A flow rate measuring apparatus comprising:

a frame having an inclined holding surface formed at an inner peripheral surface thereof;

a sealing member fitted to and held by an outer periphery of an embedded portion of a gas turbine moving blade to be embedded in a rotor, and having formed at an outer peripheral surface thereof an inclined support surface in engagement with said inclined holding surface of said frame;

a chamber fitted with said frame;

a fluid supply source connected to said chamber via a channel;

flow rate measuring means provided on said channel: and hold-down means for pressing said gas turbine moving blade toward said frame so that a surface contact pressure is generated between said inclined support surface and said inclined holding surface when said sealing member is inserted into said frame, with said sealing member being fitted to said embedded portion of said gas turbine moving blade, and wherein:

said gas turbine moving blade has a hollow passage formed in an interior thereof for introduction of a cooling medium, and also has a cooling medium inflow port formed at a bottom surface of said embedded portion, said cooling medium inflow port communicating with said passage;

said sealing member is inserted into said frame, and said gas turbine moving blade is pressed toward said frame by said hold-down means, whereby a surface contact pressure is generated between said inclined support surface and said inclined holding surface, so that said cooling medium inflow port faces an interior of said chamber while being cut off from an outside; and flow of a fluid through said hollow passage in said gas turbine moving blade is determined by a situation of measurement by said flow rate measuring means when said fluid is supplied from said fluid supply source into said chamber and flowed into said hollow passage through said cooling medium inflow port.

8. A flow rate measuring apparatus according to claim 7, wherein said frame is composed of a metal, and said sealing member is composed of an elastic material.

9. A flow rate measuring apparatus according to claim 7, wherein said sealing member is configured such that a front end of said embedded portion protrudes from a bottom surface of said sealing member.

* * * * *